Jan. 21, 1969 J. B. BECK 3,423,630

RETRACE DRIVEN DEFLECTION CIRCUIT WITH SCR SWITCH

Filed Oct. 8, 1965

INVENTOR.
JOHN B. BECK
BY
Eugene M. Whitacre
Attorney

United States Patent Office 3,423,630
Patented Jan. 21, 1969

3,423,630

RETRACE DRIVEN DEFLECTION CIRCUIT WITH SCR SWITCH

John Brewer Beck, Indianapolis, Ind., assignor to Radio Corporation of America, a corporation of Delaware Filed Oct. 8, 1965, Ser. No. 494,184
U.S. Cl. 315—27 6 Claims
Int. Cl. H01j 29/70

ABSTRACT OF THE DISCLOSURE

A retrace driven deflection circuit employing a silicon controlled rectifier (SCR) switch. The SCR is connected in a series circuit with a voltage supply, the primary of a transformer, a parallel resonant circuit and a series resonant circuit. A deflection yoke is coupled across the transformer secondary winding and a retrace capacitor is coupled across the deflection yoke. An energy recovery diode is returned from the yoke to the voltage supply.

Figure 1:
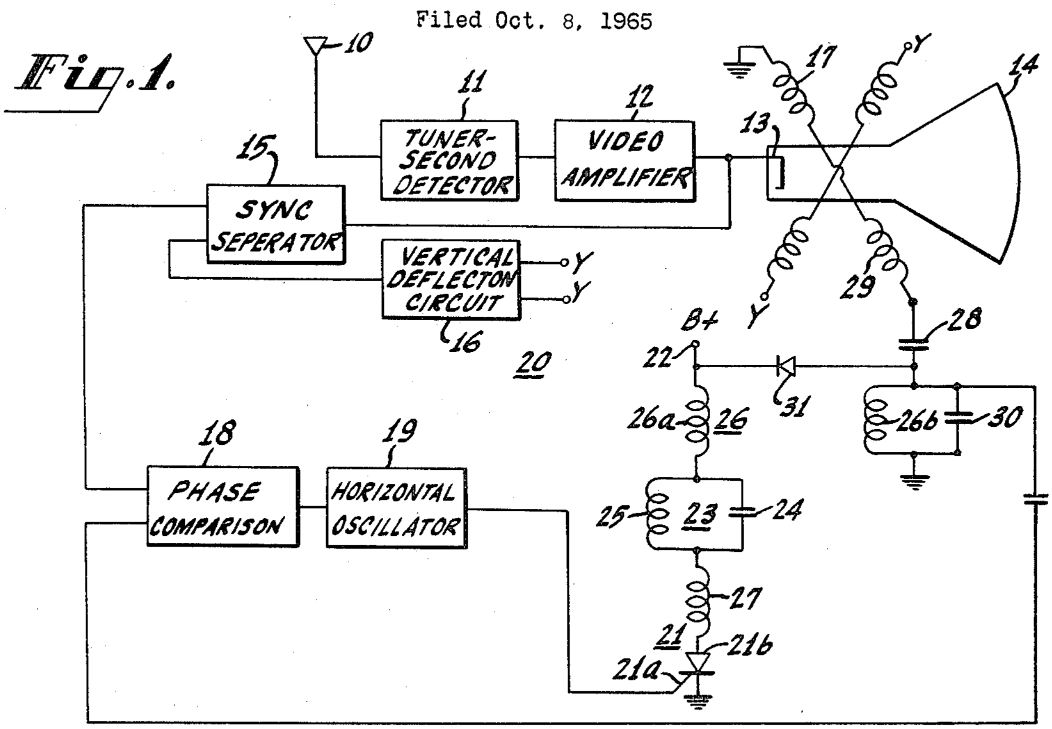

This invention relates to electron beam deflection circuits and, in particular, to a deflection circuit wherein transfer of energy to a deflection winding is effected during the retrace portion of a deflection cycle by means of a solid state semiconductor device such as a silicon controlled rectifier.

The invention is particularly useful in connection with horizontal deflection circuits for television receivers and will be described in connection with use in such apparatus.

Numerous circuit designs for transistorized television receivers either have been constructed or have been described in various technical publications. One of the most troublesome areas in such transistor receivers, from the point of view of reliability and economy, lies in the horizontal deflection circuit. In order to overcome the problems encountered in such transistorized deflection circuits, several forms of deflection circuits utilizing solid state switching devices of the silicon controlled rectifier type have been proposed. A number of the proposed SCR circuits have been handicapped by low efficiency, overly complex transformer design problems and/or excessive component rating requirements, any of which may outweigh the advantages which a silicon controlled rectifier may have vis-a-vis transistors for television deflection circuits.

It is an object of the present invention, therefore, to provide an improved electron beam deflection circuit utilizing reliable, high speed switching devices of the silicon controlled rectifier type.

It is a further object of the present invention to provide an efficient electron beam deflection circuit utilizing silicon controlled rectifiers.

It is a still further object of the present invention to provide a horizontal deflection circuit for television receivers utilizing a silicon controlled rectifier and a diode power recovery circuit, the maximum rate of change of voltage applied to the diode and the turn-off time of the controlled rectifier being controlled to permit use of relatively inexpensive components.

In accordance with the present invention, an electron beam deflection circuit comprises energy storage means including series connected inductance and capacitance and means for supplying a substantially unidirectional voltage thereto. The circuit further comprises inductive coupling means including primary and secondary windings. A deflection winding is coupled to the secondary winding. A controlled rectifier is coupled in series relation with the primary winding and with the capacitance for transferring energy from such capacitance to the deflection winding. Furthermore, a retrace capacitor coupled across the deflection winding is tuned to resonate with the deflection winding so as to produce substantially one-half cycle of oscillation during the retrace portion of each deflection cycle. A unidirectionally energy restoration means is coupled between the deflection winding and the unidirectional voltage supply means for returning energy to such supply means substantially throughout the trace portion of each deflection cycle.

Figure 2:
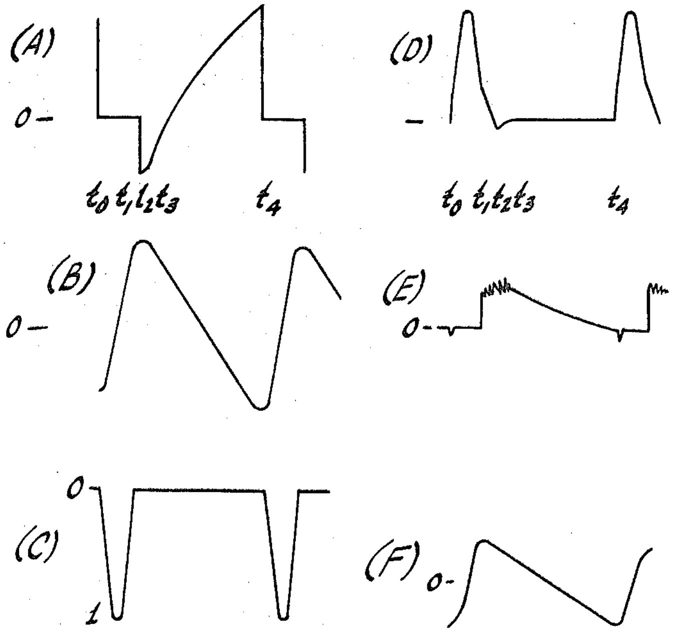

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which:

FIGURE 1 is a schematic circuit diagram, partially in block diagram form, of a television receiver embodying the invention; and FIGURE 2 is a series of voltage and current wave form diagrams (not drawn to scale) to which reference will be made in the explanation of the circuit of FIGURE 1.

Referring to FIGURE 1 of the drawing, an embodiment of the invention will be described as it may be used in a typical television receiver. The television receiver includes an antenna 10 for receiving radio frequency carrier waves upon which composite television signals are impressed. The antenna 10 couples the modulated carrier waves to a tuner-second detector 11. The tuner-second detector 11 normally includes a radio frequency amplifier, a frequency converter for converting radio frequency (R-F) waves to intermediate frequency (I-F) waves, an intermediate frequency amplifier and a detector for deriving composite television signals from the modulated intermediate frequency waves. The receiver further includes a video amplifier 12 coupled to the detector output of tuner-second detector 11. Amplified image-representative television signals produced by video amplifier 12 are coupled to a control electrode such as the cathode 13 of a television kinescope 14. Composite television signals are also applied from tuner-second detector 11 to a synchronizing signal separator circuit 15. The sync separator circuit 15 supplies vertical synchronizing pulses to a vertical deflection signal generator and output circuit 16 which in turn supplies a vertical deflection waveform to the terminals Y—Y of a deflection yoke winding 17 associated with kinescope 14.

Horizontal synchronizing pulses are derived from sync separator circuit 15 and are supplied to a phase comparison circuit 18, the latter supplying a phase error signal to a horizontal oscillator 19 to synchronize the output of oscillator 19 with the occurrence of the horizontal synchronizing pulses. The output of oscillator 19 is applied to a horizontal deflection waveform generating circuit indicated generally by the reference numeral 20. Signals (e.g., flyback pulses) representative of the timed occurrence of the horizontal deflection waveform produced by circuit 20 also are supplied to phase comparison circuit 18 to maintain operation of horizontal oscillator 19 in synchronism with the horizontal synchronizing pulses.

Horizontal deflection waveform generating circuit 20 comprises a solid state switching device such as silicon controlled rectifier (SCR) 21. SCR 21 is provided with a gate electrode **21*a* to which the output of horizontal oscillator 19 is applied, an anode electrode 21*b* and a cathode electrode 21*c*. Cathode electrode 21*c* is coupled to a reference voltage such as chassis ground. A direct voltage supply (B+) is coupled from terminal 22 to anode electrode 21$b$ by means of a series combination of energy storage components comprising the primary winding 26$a$ of a transformer 26, a first inductor 27 and a parallel resonant circuit 23 including an energy storage capacitor 24 and a second inductor 25**.

One end of secondary winding 26$b$ is coupled to a reference potential such as ground while the opposite end thereof is coupled by means of an "S"-shaping capacitor 28 to one terminal of a horizontal deflection winding 29. The opposite terminal of deflection winding 20 typically is connected to ground. A retrace capacitor 30 is coupled across the combination of "S"-shaping capacitor 28 and deflection winding 29. A power recovery diode 31 is coupled between the high voltage end of secondary winding 26$b$ and the terminal 22 of the positive voltage supply (B+).

The operation of the horizontal deflection circuit 20 constructed in accordance with the present invention will be described making reference to the waveforms shown in FIGURE 2.

Each deflection cycle may be considered as comprising a retrace portion (see, e.g., in FIGURE 2, the time interval $t_0$ to $t_1$) and a trace portion (e.g., time interval $t_1$ to $t_4$). Typically, the retrace portion is approximately 10 to 11 microseconds in duration while the trace portion is approximately 53 microseconds in duration.

The trace portion of each deflection cycle is terminated and the succeeding retrace portion commences upon application of a relatively short duration (e.g., 5 to 10 microseconds) pulse to gate electrode 21$a$ of silicon controlled rectifier 21. Such pulses are supplied by horizontal oscillator 19 at a rate of, for example, 15,750 cycles per second in timed relation with the horizontal synchronizing component of the composite video signal output of video amplifier 12.

Near the end of the trace portion of each deflection cycle (e.g., just prior to either $t_0$ or $t_4$), the voltage across energy storage capacitor 24 (waveform B), which varies substantially sinusoidally as will be pointed out below, reaches a value greater than the B+ voltage applied at terminal 22. A substantial positive voltage greater than the B+ supply voltage is therefore applied between plate 21$b$ and cathode 21$c$ of SCR 21 at this time although, as is shown in waveform D, no current flows through SCR 21. Furthermore, near the end of the trace portion of each deflection cycle, the deflection current (waveform F) flowing thru deflection winding 29 approaches a maximum in one direction while the voltage across winding 29 (waveform C) is approximately constant. Upon application of a pulse from oscillator 19 to gate electrode 21$a$, retrace is initiated as SCR 21 is rendered conductive, the voltage across SCR 21 dropping rapidly (waveform A at time $t_0$) as current flows and energy is transferred to the secondary circuit of transformer 26. A substantially sinusoidal current flows through the series energy storage circuit including the B+ supply, primary winding 26$a$, parallel resonant circuit 23, inductor 27 and SCR 21. The initial frequency of oscillation of that current is determined by the natural frequency of the series resonant circuit including capacitor 24, inductor 27 and the impedance across secondary winding 26$b$ reflected across primary winding 26$a$, the last-named impedance being capacitive at the frequency under consideration. The duration of one half-cycle of oscillation of the series resonant circuit may be adjusted equal to, less than or longer than the desired retrace time depending upon the current handling capabitilies of SCR 21. While this oscillation takes place in the primary circuit, energy is transferred to the secondary circuit, the current and voltage in the parallel circuit comprising deflection winding 29 and retrace capacitor 30 (capacitor 28 may be neglected) also undergoing substantially one-half cycle of sinusoidal oscillation (see waveforms C and F). The duration of the latter half cycle of oscillation is adjusted according to the desired retrace time interval. The provision of separate energy storage components in the primary and secondary circuits for determination of SCR conduction time and retrace time, respectively, makes it possible to select such time intervals substantially independently of each other using optimally selected component values.

A relatively large reverse voltage (e.g., of the order of a thousand volts) is produced across diode 31 during retrace, the rate of increase of that voltage being maintained within the allowable rating of diode 31 by virtue of the inclusion of retrace capacitor 30 in circuit (i.e., in the absence of capacitor 30, the voltage across diode 31 would increase to a maximum value substantially instantaneously rather than sinusoidally).

During retrace, the current through deflection winding 29 (waveform F) decreases to zero and then increases, the current in winding 29 at the end of retrace being substantially equal in magnitude to, but in a direction opposite to that at the beginning of retrace. The retrace portion of the deflection cycle ends and the trace portion thereof commences at this time as the voltage across diode 31 (waveform C) swings sufficiently positive (i.e., greater than B+) to forward bias diode 31. The trace portion of the deflection cycle ($t_1$ to $t_4$) is characterized by a substantially linearly varying current flow in deflection winding 29. A major portion of the current which flows through deflection winding 29 during the trace portion of the deflection cycle flows back through diode 31 to the B+ supply (see waveform E) effecting a conservation of energy in the deflection circuit.

At the termination of the retrace portion of the deflection cycle (e.g., at time $t_1$), the current through SCR 21 (waveform D) advantageously may be continued for a short interval ($t_1$ to $t_2$) during trace without deleteriously affecting the scanning current since, upon initiation of conduction in diode 31, the primary and secondary circuits of transformer 26 are substantially isolated one from the other.

As the trace portion of the deflection cycle commences, the secondary circuit impedance reflected across primary winding 26$a$ during retrace is removed from the primary series resonant circuit. As is shown in waveform D (i.e., at time $t_1$), the resonant period of the primary circuit therefore changes and current continues to flow through SCR 21 during part of the trace portion of the deflection cycle. The conduction interval of SCR 21 is adjusted by means of the primary series resonant circuit time constant to supply the necessary energy to the deflection circuit without exceeding the current carrying capabilities of SCR 21, the required peak SCR current decreasing as the SCR conduction interval increases. At time $t_2$, the current through SCR 21 passes through zero, and by virtue of ringing in the series resonant circuit including inductor 27 and capacitor 24, that current flows in a negative direction for a short interval so as to turn off SCR 21. The voltage across SCR 21 (waveform A) is maintained negative for an interval $t_2$ to $t_3$ as the parallel resonant circuit 23 oscillates, thereby permitting SCR 21 to return to a forward blocking condition (i.e., a pulse on gate electrode 21$a$ is required to re-initiate conduction). Parallel resonant circuit 23 is arranged to undergo substantially one-half cycle of oscillation during the part ($t_2$ to $t_4$) of the trace portion of the deflection cycle remaining after SCR 21 ceases conduction. Upon application of the next pulse from horizontal oscillator 19 to gate electrode 21$a$, the above-described energy transfer cycle is repeated.

The deflection circuit 20, as described above, may be characterized as a retrace driven deflection circuit since energy is supplied to the circuit via SCR 21 during the retrace portion of each deflection cycle. That is, energy is transferred from capacitor 24 to deflection winding 29 during retrace while, at the same time, energy is supplied to capacitor 24 from the B+ supply. As was pointed out in the description of operation, a portion of the supplied energy is recovered during the trace portion of each deflection cycle by means of the connection of diode 31 to the B+ supply.

What is claimed is:

1. In an electron beam deflection circuit for producing a periodically recurring deflection current during recurring deflection cycles each defined by a relatively long duration trace portion and a relatively short duration retrace portion, the combination comprising:

energy storage means including series connected inductance and capacitance and means for supplying a substantially unidirectional voltage thereto, inductive coupling means including primary and secondary windings, an inductive deflection winding coupled to said secondary winding, controlled rectifier means coupled in series relation with said primary winding and with said capacitance for transferring energy from said capacitance to said deflection winding during each said retrace portion, a retrace capacitor coupled across said deflection winding tuned to resonate with the inductance thereof so as to produce substantially one-half cycle of oscillation during the retrace portion of said deflection cycle, and unidirectionally conductive energy restoration means coupled between said deflection winding and said unidirectional voltage supplying means for returning energy to said supply means substantially throughout the trace portion of said deflection cycle.

2. In an electron beam deflection circuit for producing a periodically recurring deflection current during recurring deflection cycles each defined by a relatively long duration trace portion and a relatively short duration retrace portion, the combination comprising:

energy storage means including series connected inductance and capacitance and means for supplying a substantially unidirectional voltage thereto, inductive coupling means including primary and secondary windings, an inductive deflection winding coupled to said secondary winding, controlled rectifier means coupled in series relation with said primary winding, said capacitance and said inductance for transferring energy from said capacitance to said deflection winding during each said retrace portion, a retrace capacitor coupled across said deflection winding tuned to resonate with the inductance thereof so as to produce substantially one-half cycle of oscillation during the retrace portion of said deflection cycle, and unidirectionally conductive energy restoration means coupled between said deflection winding and said unidirectional voltage supplying means for returning energy to said supply means substantially throughout the trace portion of said deflection cycle.

3. In an electron beam deflection circuit for producing a periodically recurring deflection current during recurring deflection cycles each defined by a relatively long duration trace portion and a relatively short duration retrace portion, the combination comprising:

energy storage means including series connected inductance and capacitance and means for supplying a substantially unidirectional voltage thereto, inductive coupling means including primary and secondary windings, an inductive deflection winding coupled to said secondary winding, controlled rectifier means coupled in series relation with said voltage supplying means, said primary winding, said capacitance and said inductance for transferring energy from said capacitance to said deflection winding, and for transferring energy from said voltage supplying means to said energy storage means during each said retrace portion, a retrace capacitor coupled across said deflection winding tuned to resonate with the inductance thereof so as to produce substantially one-half cycle of oscillation during the retrace portion of said deflection cycle, and unidirectionally conductive energy restoration means coupled between said deflection winding and said unidirectional voltage supply means for returning energy to said supply means substantially throughout the trace portion of said deflection cycle.

4. In an electron beam deflection circuit for producing a periodically recurring deflection current during recurring deflection cycles defined by a relatively long duration trace portion and a relatively short duration retrace portion, the combination comprising:

energy storage means including series connected inductance and capacitance and means for supplying a substantially unidirectional voltage thereto, inductive coupling means including primary and secondary windings, an inductive deflection winding coupled to said secondary winding, controlled rectifier means coupled in series relation with said primary winding and with said capacitance for transferring energy from said capacitance to said deflection winding during each said retrace portion, a parallel inductance coupled across said capacitance in energy exchange relationship, a retrace capacitor coupled across said deflection winding tuned to resonate with the inductance thereof so as to produce substantially one-half cycle of oscillation during the retrace portion of said deflection cycle, and undirectionally conductive energy restoration means coupled between said deflection winding and said unidirectional voltage supplying means for returning energy to said supply means substantially throughout the trace portion of said deflection cycle.

5. In an electron beam deflection circuit for producing a periodically recurring deflection current during recurring deflection cycles defined by a relatively long duration trace portion and a relatively short duration retrace portion, the combination comprising:

means for supplying a substantially unidirectional voltage, a controlled rectifier, primary circuit means series connected with said rectifier and with said voltage supplying means for controlling the conduction interval of said rectifier, said primary circuit means including inductance, capacitance and a primary transformer winding, the conduction interval of said rectifier being substantially equal to one-half the natural resonant period of said primary circuit means, the combination further comprising secondary circuit means inductively coupled to said primary circuit means and including an inductive deflection winding and a retrace capacitor coupled across said deflection winding tuned to resonate with the inductance thereof so as to produce substantially one-half cycle of oscillation during the retrace portion of said deflection cycle, and unidirectionally conductive energy restoration means coupled between said deflection winding and said unidirectional voltage supplying means for returning energy to said supply means substantially throughout the trace portion of said deflection cycle.

6. The combination according to claim 5 and further comprising a parallel inductance coupled across said primary capacitance tuned to resonate therewith such that the voltage across said parallel inductance and capacitance passes through substantially one-half cycle of oscillation during the segment of the trace portion of each deflection cycle remaining after completion of the conduction interval of said controlled rectifier.

References Cited

UNITED STATES PATENTS

| | | | |
|---|---|---|---|
| 3,189,782 | 6/1965 | Heffron | 315—27 |
| 3,248,598 | 4/1966 | Walker | 315—27 |

RODNEY D. BENNETT, *Primary Examiner.*

JOSEPH G. BAXTER, *Assistant Examiner.*